United States Patent [19]

Douchy et al.

[11] 4,364,770

[45] Dec. 21, 1982

[54] MANUFACTURE OF A COMPOSITE TUBULAR PRODUCT

[75] Inventors: Michel Douchy, Solesmes; Jean-Louis Tranchant, Valenciennes; Michel Jéhan, La Flamengrie, all of France

[73] Assignee: Vallourec, Paris, France

[21] Appl. No.: 237,805

[22] Filed: Feb. 24, 1981

[30] Foreign Application Priority Data

Feb. 26, 1980 [FR] France .................. 80 04194

[51] Int. Cl.³ .................................. C22B 9/00
[52] U.S. Cl. .................................. 75/53; 75/58; 75/93 G
[58] Field of Search ............... 75/93 G, 53, 58, 129, 75/130; 219/145; 29/420.5

[56] References Cited

U.S. PATENT DOCUMENTS

| | | | |
|---|---|---|---|
| 3,841,616 | 10/1974 | Rocher | 75/53 |
| 3,942,775 | 3/1976 | La Bate | 75/53 |
| 4,057,420 | 11/1977 | Brace | 75/53 |
| 4,085,252 | 4/1978 | Karinthi | 75/53 |
| 4,094,666 | 6/1978 | Ototani | 75/53 |
| 4,108,637 | 8/1978 | Hetke | 75/53 |
| 4,126,446 | 11/1978 | Knorre | 75/53 |
| 4,143,211 | 3/1979 | Obinata | 75/58 |
| 4,154,604 | 5/1979 | Gruner | 75/53 |
| 4,174,962 | 11/1979 | Frantzreb | 75/93 G |
| 4,175,918 | 11/1979 | Frantzreb | 75/53 |

Primary Examiner—P. D. Rosenberg
Attorney, Agent, or Firm—Pollock, Vande Sande & Priddy

[57] ABSTRACT

For the purpose of introducing an additive into a molten metal bath, a reactive powder is enclosed in a tubular sleeve composed of a metal compatible with the bath. The cross-section of the sleeve is reduced after filling to compact the powder while leaving it porous. The filled sleeve can be formed by profiling a metal strip to a cup-shaped cross-section, metering the powder into the cup-shaped profile, closing the edges of the strip together to enclose the powder, forming the edges to hook together and crimping the hooked edges.

13 Claims, 12 Drawing Figures

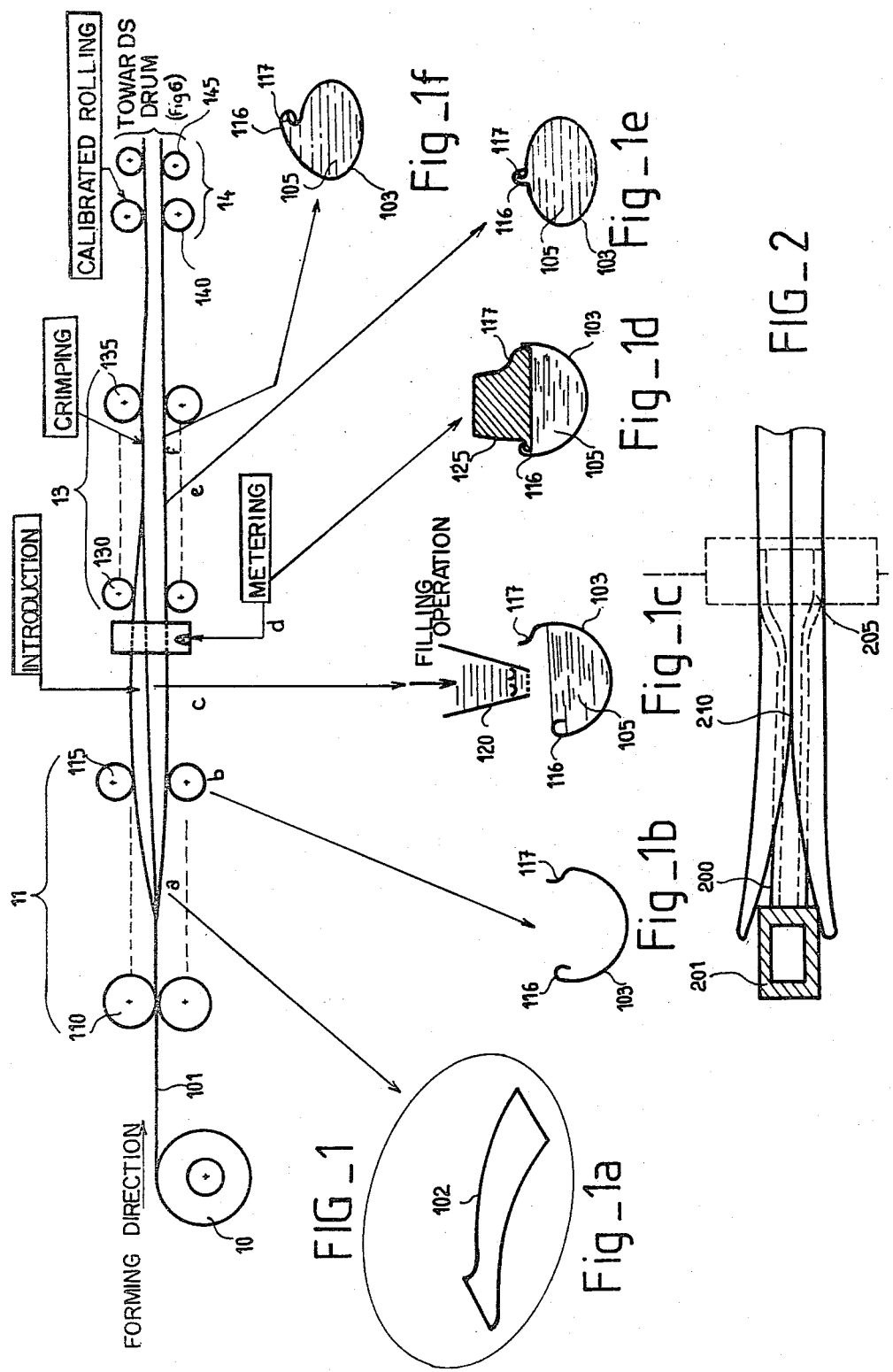

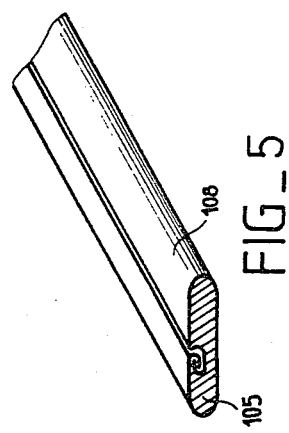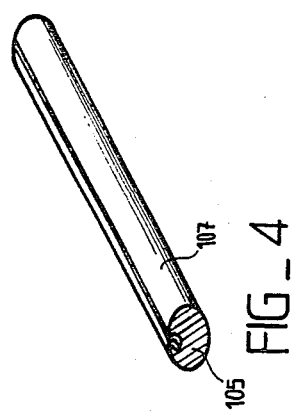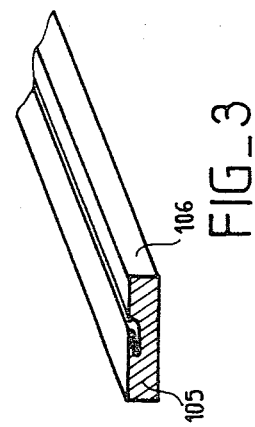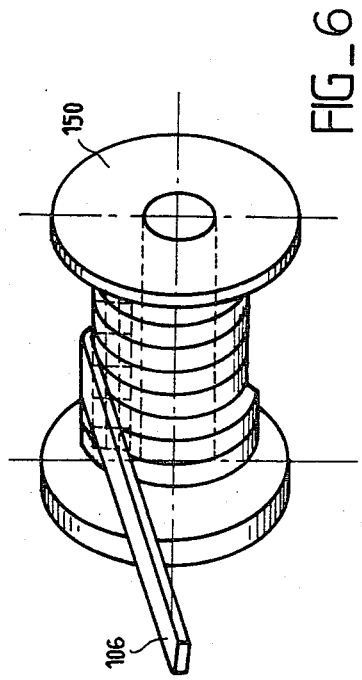

MANUFACTURE OF A COMPOSITE TUBULAR PRODUCT

The invention relates, in general terms, to the packaging of delicate and/or consumable products. More especially, but not exclusively, it relates to additives intended for the calming of molten metal baths.

The introduction of these pulverulent additives is a delicate matter. It is necessary to introduce a carefully metered amount thereof into the body of the bath within a very short time, and to do so in a high-temperature environment. The means used in the past, namely, a metal lance which penetrates into the bath and is fed with additive powder, is not fully satisfactory, either technically or economically.

Attempts have also been made to introduce the additives in the form of a wire immersed continuously in the bath. To date, this process has not proved entirely satisfactory, nor has it undergone major industrial development.

The object of the present invention is the manufacture of a novel composite tubular product which can serve as a vehicle for additive powders of the type referred to above. In general terms, this involves the process of filling a tubular envelope with an insert material, e.g., a powder capable of aggregation. After filling, the cross-section of the tubular product, having a substantially constant circumference, is reduced, which makes it possible to compact the powder in situ in a desired manner, while assuring that it is well retained within the product.

Preferably, the preparation of the tubular envelope comprises the following steps:

(a) profiling a strip of wall material so as to impart to it a cup-shaped cross-section, (b) introducing, in a quantified manner, a deformable insert material into the cup-shapedprofile thus formed, and (c) again profiling the free edges of the cup, so as to close them over the insert material, while hooking them one over the other, accompanied by crimping.

This process produces, according to the invention, a composite tubular product which is easily handled and can be wound up for storage. Very advantageously, the said operations are carried out continuously, in the cold. The reduction in cross-section takes place with virtually no axial elongation.

For a particular application (namely, metallurgical treatment of molten metal baths), the wall material is a metal which is not reactive towards the bath, while the insert material is a reactive powder.

The invention also relates to the composite tubular product, which can be obtained by this process or in some other manner.

Other characteristics and advantages of the invention will be apparent from the detailed description which now follows and by reference to the attached drawings, which illustrate a preferred embodiment of the invention, and in which:

FIG. 1 illustrates, in a general manner, a forming sequence which employs the process of the invention;

FIGS. 1a to 1f illustrate the shape of the profile at different points of FIG. 1;

FIG. 2 illustrates a variant of the forming sequence according to the invention;

FIGS. 3 to 5 illustrate different shapes of composite profiles manufactured according to the invention; and FIG. 6 illustrates how the profile according to the invention can be stored, wound up on a drum.

Though the invention has various applications, the following description is concerned more especially with the calming and metallurgical treatment of molten metal baths, in which case the wall material is a metal sheet compatible with the bath, e.g., steel, cooper, aluminum or other metal, while the insert material is the treatment powder.

In FIG. 1, a roller 10 delivers a metal strip 101, for example of steel, to a continuous cold forming sequence, which starts with a first series 11 of rollers such as 110 to 115. At point a (FIG. 1a), the shaping of the edges 116 and 117 of the metal strip 103 is started. At point b (last rollers 115, and FIG. 1b), the strip has been given a half-closed or cup-shaped cross-section, its two edges 116 and 117 being so shaped as to make possible subsequent attachment to one another.

At point c, a dispensing nozzle 120 fills the cup 103 with the treatment powder 105. This filling can itself be quantitatively controlled by regulating the powder flow rate (e.g., through the pressure applied). Preferably, precise metering of the powder is effected shortly afterwards, e.g., by levelling out the powder by means of a doctor 125. Advantageously, the doctor also wipes the inner face of the edges 116 and 117.

Thereafter, the forming sequence comprises a second series 13 of forming rollers, such as 130 to 135. These bring the edges 116 and 117 towards one another and attach them to one another at point e (FIG. 1e), and then crimp the bond thus formed by flattening the joint of the two edges (FIG. 1f).

Thereafter, the forming sequence is completed by a third series 14 of rollers, such as 140 to 145, which bring the product to the desired shape while reducing its cross-section, with the circumference remaining constant and without axial elongation. The powder is thus compacted in situ, which makes it very homogeneous and causes it to hold excellently inside the envelope. In this way, limited compression of the powder is achieved, so that the powder remains porous.

Since the closed up (FIG. 1f) has virtually equal vertical and horizontal dimensions (whether it be round or square), it is easy to obtain, according to the invention, a profile which is rectangular (106, FIG. 3), oval (107, FIG. 4) or rectangular with semi-circular narrow sides (108, FIG. 5). The crimped joint is ultimately folded over onto one of the broad sides of the rectangle or of the oval.

The composite tubular profile thus obtained can easily be wound on a drum 150 (FIG. 6, the profile in this case having the rectangular cross-section 106), preferably with the profile being guided by a heart-shaped cam or any other means which assures suitable winding.

In certain cases, especially where the envelope is very thick, the introduction and metering of the powder can be effected as illustrated in FIG. 2; a hollow mandrel 200 is supported by a bar 201, which is also hollow, and can be introduced into the cup before the latter is closed, the cup being formed at 210 by rollers (not shown). The product, in powder form, is pushed into the mandrel-holder bar 201 and the hollow mandrel 200 and is thereby introduced into the cup at the level of the mandrel head 205. The latter is flared to the appropriate shape and serves at the same time as a support for the crimping of the edges 116 and 117, as illustrated in FIG 1f. Thereafter, the product is compacted by means of the third series 14 of rollers (FIG. 1).

It will be understood that filling can alternatively be affected by other means of injection, with or without gas pressure, depending on the characteristics of the powder and the geometrical shape of the envelope.

The application to the case of treating molten metal baths takes place as follows. The amount of product required is known. The drum 150 is brought above the bath and the appropriate length of the composite product of the invention is unrolled into the bath within a short period and cut off by means appropriate to the purpose of the process. This method is particularly suitable for steel ladles or for continuous casting dispensers.

The metal envelope is generally produced from a sheet or foil which is folded and crimped and consists of the same base metal as the liquid metal. The envelope is thus, in this sense, not reactive towards the metal bath.

The internal insert material can consist of metals or alloys, slags or a mixture of these products. The powder can in particular contain reactive materials for producing refining reactions, or for modifying the nature of the inclusions in the metal to be treated, or to act as adjuvants, and may comprise:

reactive materials, especially calcium, magnesium, sodium, borum, titanium, zirconium and the rare earths;

various additive materials, especially lead, bismuth, selenium and tellurium;

any metal alloy containing the above materials and base metals, especially iron, silicon, aluminium and copper.

The powder can also consist of powdered slags, whose composition corresponds to that of the slags usually employed in metal-formulating reactions or in refining reactions of the treated liquid metal.

EXAMPLE

A composite profile product of cross-section 11×6 mm was produced by the process described above. The cold deformation, at constant circumference, was effected on a round product of diameter 10.0 mm, which had been filled beforehand with powder in accordance with the above process. The corresponding reduction in cross-section is thus about 16%. The wall thickness of the envelope was 0.4 mm, the envelope being made of mild steel. The powder in the interior was based on silico-calcium, containing 30% calcium.

Experiments showed that the rectangular composite product has excellent mechanical stability, especially upon rolling-up. It penetrates well into the body of a molten steel bath. Since it remains both porous and compressed, the powder participates in a reaction with the liquid metal which proceeds with excellent efficiency and good yield.

Furthermore, in practical terms, during laying-down of the composite rectangular product on a bobbin, the bobbin is built up to a density which is 20-25% greater than would be the case with a round product.

Present invention is not restricted to the embodiment described, but is capable of the applications, e.g., to steel welding electrodes which contain their flux internally and are used for bath welding.

We claim:

1. Process for the manufacture of a composite tubular product comprising the steps of:
   (a) filling a tubular envelope with a powder capable of aggregation; and
   (b) reducing the cross-section of the filled tubular envelope while keeping its circumference substantially constant;
   (c) whereby said powder is compacted in situ while being safely retained within said tubular product.

2. Process of manufacture according to claim 1, wherein the preparation of said tubular envelope comprises the following steps:
   (a) profiling a strip of wall material so as to impart to it a cup-shaped cross-section;
   (b) controllably introducing said powder into the cup-shaped profile thus formed; and
   (c) again profiling the free edges of the cup, so as to close them over said insert material, while hooking them one over the other, accompanied by crimping;
   (d) thereby producing a composite tubular product which is easily handled and can be wound up for purposes of storage.

3. Process of manufacture according to claim 1 or 2, wherein said operations are carried out continuously and in the cold.

4. Process of manufacture according to claim 3, wherein step (b) employs a calibrated dispenser for the powder insert material, as well as a doctoring which levels the powder inside the cup.

5. Process of manufacture according to claim 3, wherein steps (b) and (c) are carried out simultaneously, the powder being introduced along the axis of a hollow mandrel the head of which forms an internal support during profiling and during hooking together of the free edges.

6. Process of manufacture according to claim 4 or 5, wherein said wall material is a non-reactive metal and said insert material is a reactive powder.

7. Process of manufacture according to claim 1, wherein the final cross-section of said product is flattened.

8. Process of manufacture according to claim 7, wherein the final cross-section of said product is rectangular.

9. Composite tubular product comprising a closed profiled tubular envelope filled with an aggregated powder having a flattened cross section.

10. Composite tubular powder according to claim 9, compacted in situ by deforming said envelope while keeping its circumference substantially constant.

11. Composite tubular product according to claim 9, wherein said tubular envelope is made of a non-reactive metal, shaped cold from a strip which is closed again and whose edges are crimped to one another.

12. Composite tubular product according to claim 9, wherein said powder is a reactive powder which is compacted but porous.

13. Composite tubular product according to claim 9, said product having a flattened, substantially rectangular cross-section, the crimped part being folded onto the profile.

* * * * *

REEXAMINATION CERTIFICATE (1062nd)
United States Patent
[11] B1 4,364,770

Douchy et al.

[45] Certificate Issued * May 30, 1989

[54] MANUFACTURE OF A COMPOSITE TUBULAR PRODUCT

[75] Inventors: Michel Douchy, Solesmes; Jean-Louis Tranchant, Valenciennes; Michel Jéhan, La Flamengrie, all of France

[73] Assignee: Vallourec, Paris, France

Reexamination Request:
No. 90/000,992, Apr. 23, 1986

Reexamination Certificate for:
Patent No.: 4,364,770
Issued: Dec. 21, 1982
Appl. No.: 237,805
Filed: Feb. 24, 1981

[ * ] Notice: The portion of the term of this patent subsequent to Aug. 21, 1999 has been disclaimed.

[30] Foreign Application Priority Data

Feb. 26, 1980 [FR] France ................................. 80 04194

[51] Int. Cl.⁴ ................................. C22B 9/00; C21C 7/064
[52] U.S. Cl. ................................. 75/53; 75/58; 75/93 G
[58] Field of Search ................................. 75/93 G, 53, 58, 129, 75/130; 219/145; 29/422

[56] References Cited

U.S. PATENT DOCUMENTS 2,576,698 11/1951 Russum ................................. 29/422
2,747,345 5/1956 Plastino ................................. 29/422

*Primary Examiner*—Peter D. Rosenberg

[57] ABSTRACT

For the purpose of introducing an additive into a molten metal bath, a reactive powder is enclosed in a tubular sleeve composed of a metal compatible with the bath. The cross-section of the sleeve is reduced after filling to compact the powder while leaving it porous. The filled sleeve can be formed by profiling a metal strip to a cup-shaped cross-section, metering the powder into the cup-shaped profile, closing the edges of the strip together to enclose the powder, forming the edges to hook together and crimping the hooked edges.

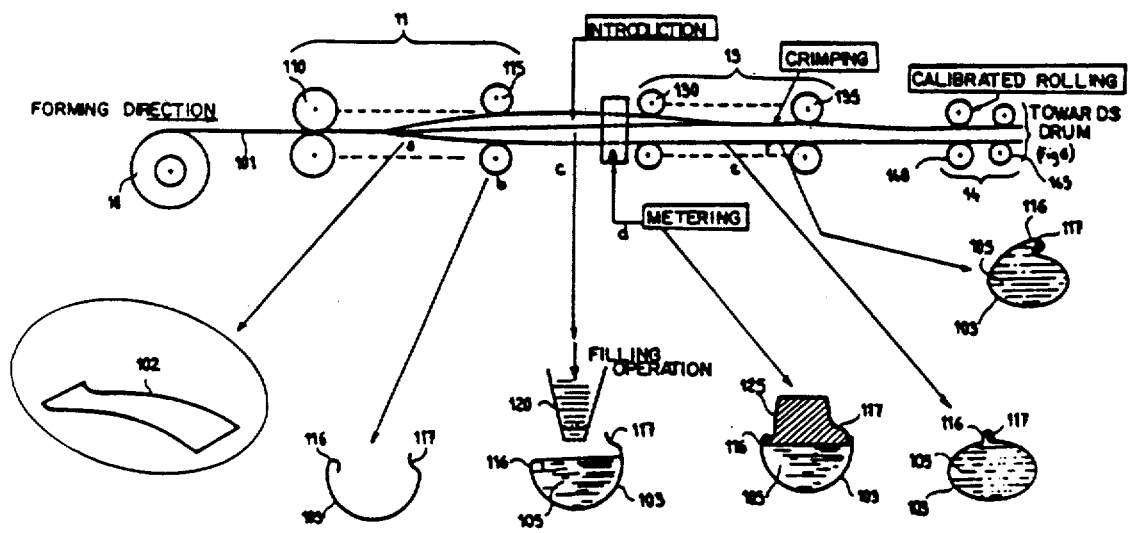

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 2, lines 35-43:
Thereafter, the forming sequence is completed by a third series 14 of rollers, such as 140 to 145, which bring the product to the desired shape while reducing its cross-section, with the [circumference] *perimeter* remaining constant and without axial elongation. The powder is thus compacted in situ, which makes it very homogeneous and causes it to hold excellently inside the envelope. In this way, limited compression of the powder is achieved, so that the powder remains porous.

AS A RESULT OF REEXAMINATION, IT HAS BEEN DETERMINED THAT:

Claims 1, 2, 7, 9 and 10 are cancelled.

Claims 3, 8 and 11-13 are determined to be patentable as amended.

Claims 4-6, dependent on an amended claim, are determined to be patentable.

New claims 14-19 are added and determined to be patentable.

3. Process of manufacture according to claim [1 or 2] *14*, wherein said operations are carried out continuously and in the cold.

8. Process of manufacture according to claim [7] *14*, wherein the final cross-section of said product is *substantially* rectangular.

11. Composite tubular product according to claim [9,] *15*, wherein said tubular envelope is made of a non-reactive metal, shaped cold from a strip which is closed again and whose edges are crimped to one another.

12. Composite tubular product according to claim [9,] *15*, wherein said powder is a reactive powder which is compacted but porous.

13. Composite tubular product according to claim [9,] *15*, said product having a flattened, substantially rectangular cross-section, the crimped part being folded onto the profile.

*14. Process for the manufacture of a composite tubular product comprising the steps of:*
  *(a) profiling a strip of wall material so as to impart to it a cup-shaped cross-section;*
  *(b) controllably introducing a powder capable of aggregation into the cup-shaped profile thus formed;*
  *(c) again profiling the free edges of the cup, so as to close them over said powder, while hooking them one over the other, accompanied by crimping to obtain a filled closed tubular envelope of substantially round cross-section;*
  *(d) reducing the cross-sectional area of the filled tubular envelope while keeping its perimeter substantially constant, the cross-section of said filled tubular envelope being flattened;*
  *whereby said powder is compacted in situ while being safely retained within said tubular product.*

*15. Composite tubular product comprising a closed profiled tubular envelope filled with a powder, wherein the powder has been compacted in situ by deforming said envelope while keeping its perimeter substantially constant.*

*16. Composite tubular product comprising a closed profiled tubular envelope filled with a compacted powder having a flattened cross-section wherein said envelope is made out of a strip and is closed along its length, this closure being effected by hooking along the length of two edges of the strip accompanied by crimping.*

*17. Process of claim 14 wherein the crimped free edges of the strip are folded over onto the final cross-section during step (d).*

*18. Process of claim 14 wherein the order of steps is first (a), second (b), third (c) and fourth (d).*

*19. Composite tubular product according to claim 16 wherein the flattened cross-section is substantially rectangular.*

* * * * *